United States Patent
Fukuda et al.

(10) Patent No.: US 12,187,299 B2
(45) Date of Patent: Jan. 7, 2025

(54) VEHICLE MOUNTED ELECTRONIC CONTROL APPARATUS

(71) Applicant: Hitachi Astemo, Ltd., Hitachinaka (JP)

(72) Inventors: Toru Fukuda, Hitachinaka (JP); Yoshitaka Tokunaga, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 8 days.

(21) Appl. No.: 17/781,514

(22) PCT Filed: Nov. 20, 2020

(86) PCT No.: PCT/JP2020/043336
§ 371 (c)(1),
(2) Date: Jun. 1, 2022

(87) PCT Pub. No.: WO2021/111896
PCT Pub. Date: Jun. 10, 2021

(65) Prior Publication Data
US 2023/0001939 A1    Jan. 5, 2023

(30) Foreign Application Priority Data
Dec. 5, 2019 (JP) .................................. 2019-220135

(51) Int. Cl.
*B60W 50/02* (2012.01)
*B60R 16/023* (2006.01)
(Continued)

(52) U.S. Cl.
CPC ..... *B60W 50/0225* (2013.01); *B60R 16/0232* (2013.01); *G06F 11/006* (2013.01);
(Continued)

(58) Field of Classification Search
CPC ..... B60W 50/0225; B60W 2050/0085; B60W 2710/06; B60W 2710/244;
(Continued)

(56) References Cited

U.S. PATENT DOCUMENTS

| 2005/0216135 A1* | 9/2005 | Sayama | ................. B60R 16/03 |
| | | | 701/1 |
| 2006/0293831 A1* | 12/2006 | Yano | ................. G05B 23/0235 |
| | | | 701/114 |

(Continued)

FOREIGN PATENT DOCUMENTS

| DE | 102004049099 | * 10/2005 | ............ B60R 16/03 |
| JP | 2013-143093 A | 7/2013 | |

(Continued)

OTHER PUBLICATIONS

KR_20190045677 Original and translation (Year: 2019).*

*Primary Examiner* — Joan T Goodbody
(74) *Attorney, Agent, or Firm* — Volpe Koenig

(57) ABSTRACT

The present invention has been made in view of the above problems, and an object of the present invention is to, when an abnormality is detected in an electronic control apparatus that controls a plurality of functions, continue an operation without affecting the other function and secure safety of a control target device corresponding to the function in which the abnormality is detected. In the vehicle mounted electronic control apparatus according to the present invention, each of a first computing portion and a second computing portion outputs an operation check signal, and a driver control unit sets a driver corresponding to the computing portion in which an abnormality is indicated by the operation check signal among the first computing portion and the second computing portion, to a degenerated state.

7 Claims, 4 Drawing Sheets

(51) Int. Cl.
  *G06F 11/00*    (2006.01)
  *B60W 50/00*    (2006.01)
(52) U.S. Cl.
  CPC . *B60W 2050/0085* (2013.01); *B60W 2710/06* (2013.01); *B60W 2710/244* (2013.01); *B60W 2710/30* (2013.01)
(58) Field of Classification Search
  CPC ............ B60W 2710/30; B60R 16/0232; G06F 11/2028; G06F 11/2025; G06F 11/006
  See application file for complete search history.

(56) References Cited

U.S. PATENT DOCUMENTS

| | | | | |
|---|---|---|---|---|
| 2011/0246820 | A1* | 10/2011 | Murao | G06F 11/1637 714/10 |
| 2015/0175010 | A1* | 6/2015 | Tang | H02H 7/08 701/22 |
| 2016/0001781 | A1* | 1/2016 | Fung | G07C 9/37 701/36 |
| 2017/0309092 | A1* | 10/2017 | Rosenbaum | G01M 17/007 |

FOREIGN PATENT DOCUMENTS

| | | | | |
|---|---|---|---|---|
| JP | 2015-103052 A | | 6/2015 | |
| JP | 6380141 | * | 8/2018 | ............. G06F 11/20 |
| KR | 20190045677 | * | 5/2019 | ............. B60R 16/03 |

* cited by examiner

VEHICLE MOUNTED ELECTRONIC CONTROL APPARATUS

TECHNICAL FIELD

The present invention relates to a vehicle mounted electronic control apparatus mounted on a vehicle.

BACKGROUND ART

An electronical control unit (ECU) mounted on a vehicle generally includes a monitoring unit that monitors whether or not a microcomputer in the ECU operates normally. In general, one monitoring unit is disposed for one microcomputer. The monitoring unit can be configured by, for example, a watch dog timer (WDT). If the monitoring result by the monitoring unit is abnormal, the microcomputer is reset to attempt to recover the microcomputer from the abnormal state.

PTL 1 listed below discloses a technique having an object that "there is provided a vehicle-mounted electronic control apparatus that enables failure monitoring of a multi-core CPU at low cost without increasing the number of monitoring CPUs". In this technique, "a CPU core 10 in a control IC 2 is set as a main CPU core, other CPU cores 20, 30, and 40 are set sub CPU cores, the CPU cores 20, 30, and 40 calculate answer data to example data transmitted by the CPU core 10 and transmit the answer data to the CPU core 10, the CPU core 10 calculates answer data to example data transmitted by a monitoring IC 3 and transmits the example data to the CPU cores 20, 30, and 40, and generates final answer data based on the own answer data and the answer data transmitted as a response by the CPU cores 20, 30, and 40 and transmits the final answer data to the monitoring IC 3, and the monitoring IC 3 diagnoses a failure of the control IC 2 based on a collation result between the final answer data received from the CPU core 10 and an answer data expected value prepared in advance" (see Abstract).

PTL 2 listed below discloses a technique having an object in which "there is provided an information processing apparatus capable of, even though an abnormality is detected in one of two or more applications, continuously executing the other application". In this technique, "the information processing apparatus includes a plurality of applications, application monitoring means 60 for counting the number of times of in-operation notifications for each application in a first count period, and application control means 32 for controlling an operation of the application, in which, when the application monitoring means detects an abnormality sign of the application based on the number of previous in-operation notifications of the application, the application control means stops transmission of an in-operation notification of an application having a lowest priority, and the application of which the abnormality sign is not detected transmits an in-operation notification at a timing before the abnormality sign is detected, and at a timing at which an application of which the abnormality sign is detected transmits an in-operation notification or a timing before and after such a timing" (see Abstract).

CITATION LIST

Patent Literature

PTL 1: JP 2015-103052 A
PTL 2: JP 2013-143093 A

SUMMARY OF INVENTION

Technical Problem

In recent years, a vehicle mounted electronic control apparatus has come to use a multi-core microcomputer including a plurality of processor cores. The multi-core microcomputer can execute a different function for each core. Since the cost increases if the monitoring unit is disposed for each core, it is considered that it is desirable to collectively monitor the cores by one monitoring unit.

In a multi-core microcomputer that executes a plurality of functions, when any of the functions is determined to be abnormal by the monitoring unit, the entirety of the microcomputer is reset. If the microcomputer is reset, the function that is normally operating is also reset. Thus, the operation continuity is inhibited.

In particular, in the vehicle mounted electronic control apparatus, it may be required to continue the operation. Thus, such a configuration is not desirable.

In PTL 1, one monitoring IC 3 monitors the plurality of CPU cores 10 to 40 in a manner that the CPU core 10 to 40 relays the example data transmitted by the monitoring IC 3. It is considered that such a configuration is useful in suppressing the cost of the monitoring IC 3. However, if the entirety of the CPU is reset when any of the CPU cores is abnormal, the operation continuity may be hindered.

In PTL 2, when any one of two or more applications is abnormal, the in-operation notification of the application having the lowest priority is stopped, and the other applications are continued. However, according to PTL 2, since the in-operation notification of the application having the low priority is stopped at the time of abnormality, the monitoring capability for the application is deteriorated. That is, in PTL 2, when an abnormality occurs, the microcomputer turns into a state different from a normal state. In the vehicle mounted electronic control apparatus, it is necessary to consider the operation continuity including not only the microcomputer but also a control target device (an actuator or the like included in a vehicle) controlled by the ECU. Setting the microcomputer itself in the state different from the normal state as in PTL 2 may not be necessarily optimal from the viewpoint of the operation continuity. This is because processing of restoring the microcomputer to the normal state is required.

The present invention has been made in view of the above problems, and an object of the present invention is to, when an abnormality is detected in an electronic control apparatus that controls a plurality of functions, continue an operation without affecting the other function and secure safety of a control target device corresponding to the function in which the abnormality is detected.

Solution to Problem

In the vehicle mounted electronic control apparatus according to the present invention, each of a first computing portion and a second computing portion outputs an operation check signal, and a driver control unit sets a driver corresponding to the computing portion in which an abnormality is indicated by the operation check signal among the first computing portion and the second computing portion, to a degenerated state.

Advantageous Effects of Invention

According to the vehicle mounted electronic control apparatus in the present invention, it is possible to continue an operation without affecting a function in which an abnormality does not occur, and to secure the safety of a control target device corresponding to a function in which the abnormality is detected.

DESCRIPTION OF EMBODIMENTS

First Embodiment

Figure 1:
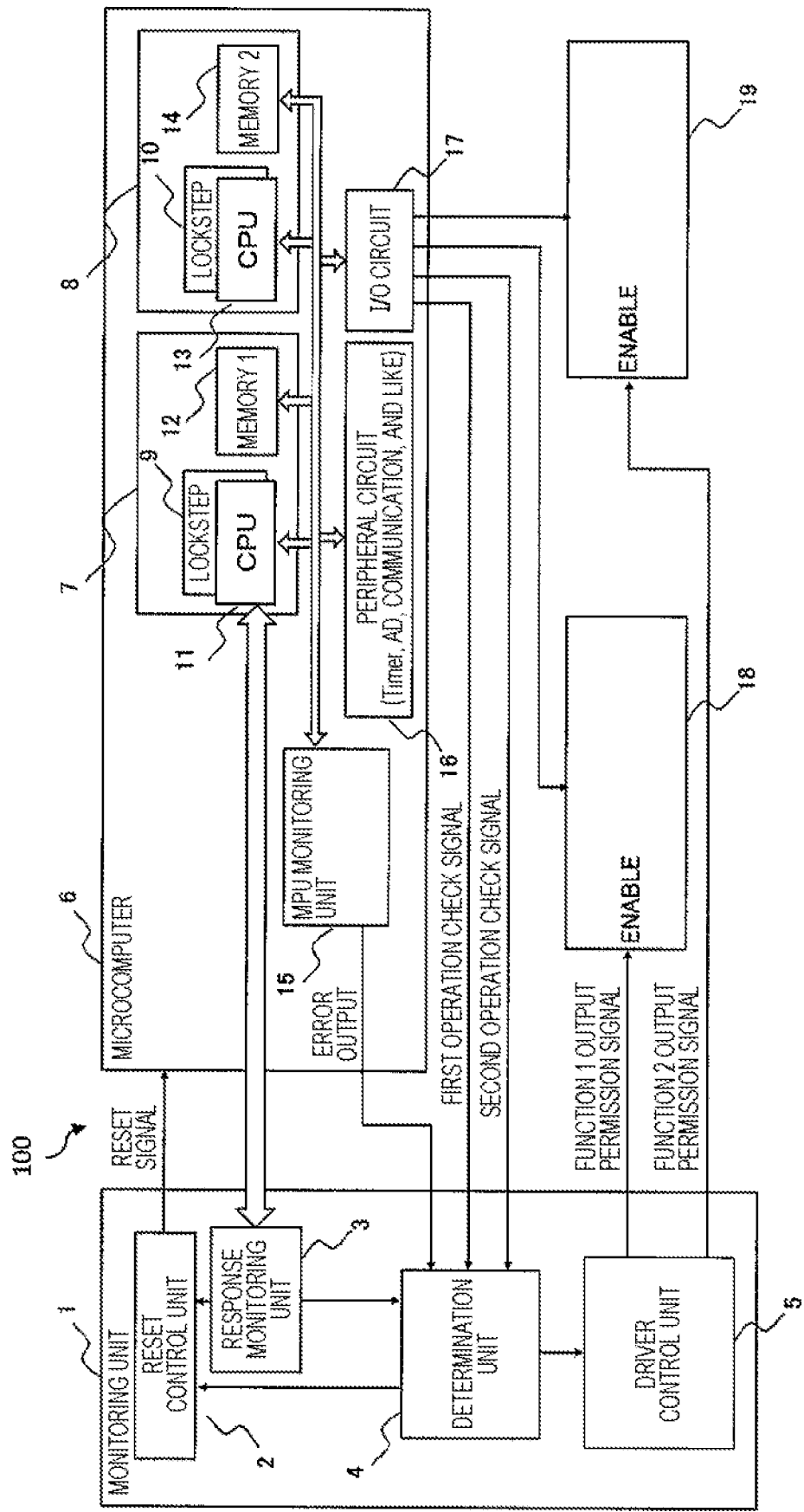
FIG. 1 is a configuration diagram of a vehicle mounted electronic control apparatus 100 according to a first embodiment.

FIG. 1 is a configuration diagram of a vehicle mounted electronic control apparatus 100 according to a first embodiment of the present invention. The vehicle mounted electronic control apparatus 100 is an electronic control device mounted on a vehicle. The vehicle mounted electronic control apparatus 100 is an apparatus that controls devices (for example, actuator and the like, specific examples will be described later) included in the vehicle.

The vehicle mounted electronic control apparatus 100 includes a monitoring unit 1, a microcomputer 6 (computing, device), a first driver 18, and a second driver 19.

The microcomputer 6 includes a central processing unit (CPU) that executes a program in which control computation for controlling devices included in the vehicle is mounted. The microcomputer 6 is a multiprocessor microcomputer including a plurality of CPUs. FIG. 1 illustrates an example including a CPU 11 (first computing portion) and a CPU 13 (second computing portion). The CPU 11 executes control computation for realizing a first function 7 (first process), and the CPU 13 executes control computation for realizing a second function 8 (second process). Regarding a functional safety requirement level in the standard with which the vehicle mounted electronic control apparatus 100 conforms, the functional safety requirement level of the first function 7 is higher than the functional safety requirement level of the second function 8.

The CPU 11 outputs a first drive signal for controlling the first driver 18 via an I/O circuit 17 in accordance with the control computation result. The first driver 18 drives a first device in accordance with the first drive signal. The CPU 13 outputs a second drive signal for controlling the second driver 19 via the I/O circuit 17 in accordance with the control computation result. The second driver 19 drives a second device in accordance with the second drive signal.

The CPU 11 outputs a first operation check signal indicating that the CPU 11 is executing the program, to the monitoring unit 1 via the I/O circuit 17. The CPU 13 outputs a second operation check signal indicating that the CPU 13 is executing the program, to the monitoring unit 1 via the I/O circuit 17.

In a lockstep 9, the same computation as that of the CPU 11 is performed. In a lockstep 10, the same computation as that of the CPU 13 is performed. An MPU monitoring unit 15 (computing device monitoring unit) included in the microcomputer 6 compares the computation result of the CPU with the computation result of the lockstep. When the computation results are not the same as each other, the MPU monitoring unit 15 outputs a signal (error output) indicating that the microcomputer 6 is abnormal, to the monitoring unit 1.

The microcomputer 6 further includes memories 12 and 14, a peripheral circuit 16, and the like. The memories 12 and 14 are storage devices that store data and the like used by the CPUs 11 and 13, respectively.

The peripheral circuit 16 is, for example, another circuit such as a timer, an AD converter, or a communication interface, which is generally included in the microcomputer 6. The MPU monitoring unit 15 monitors whether or not the memories 12 and 14, the peripheral circuit 16, and the I/O circuit 17 are normal in addition to each CPU, and outputs an error output to the monitoring unit 1 when any of the above components is abnormal. Thus, the MPU monitoring unit 15 has a role of monitoring an occurrence of a problem in the microcomputer 6.

The monitoring unit 1 includes a reset control unit 2, a response monitoring unit 3, a determination unit 4, and a driver control unit 5. The reset control unit 2 outputs a reset signal to the microcomputer 6 in accordance with an instruction from the determination unit 4. The response monitoring unit 3 monitors the operation of the CPU 11. The response monitoring unit 3 can be configured by, for example, a WDT. The determination unit 4 determines whether the microcomputer 6 is normal, in accordance with a procedure to be described later. The driver control unit 5 outputs a signal (function 1 output permission signal) for controlling the first driver 18 and a signal (function 2 output permission signal) for controlling the second driver 19, in accordance with an instruction from the determination unit 4.

Figure 2:
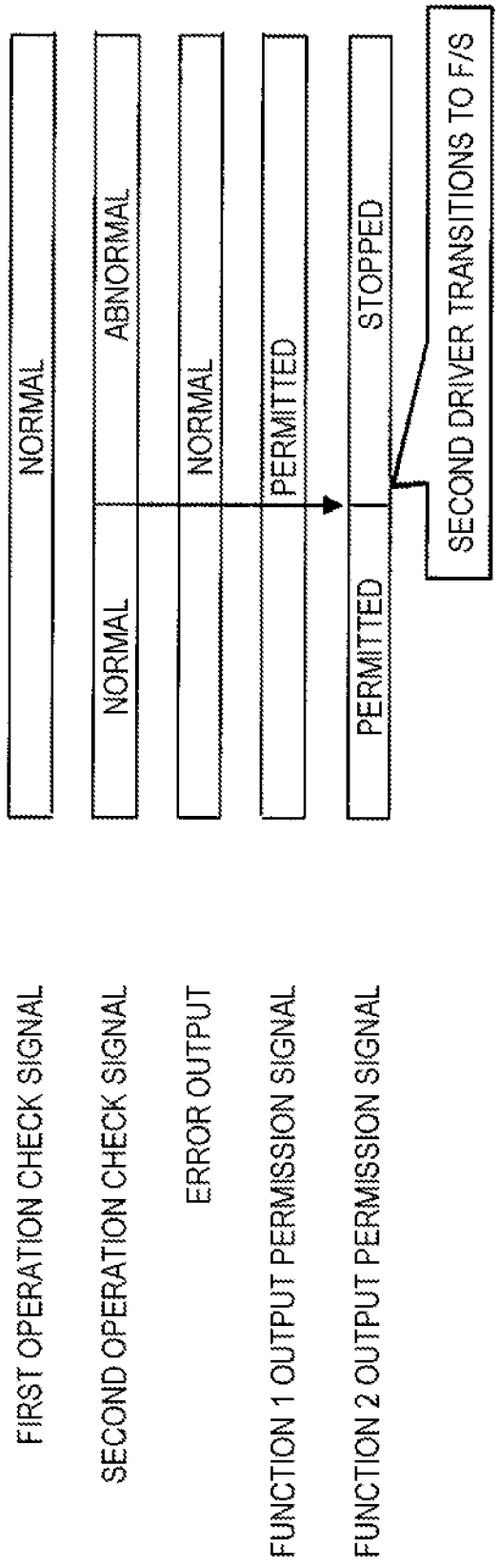
FIG. 2 is a time chart for explaining a procedure in which a determination unit 4 controls each driver.

FIG. 2 is a time chart for explaining a procedure in which the determination unit 4 controls each driver. The determination unit 4 instructs the driver corresponding to the operation check signal indicating the abnormality to stop the output. In FIG. 2, since the second operation check signal indicates the abnormality, the determination unit 4 instructs the second driver 19 to stop the output. Then, the second driver 19 does not output the second drive signal to the second device. When a plurality of operation check signals indicate the abnormality, the driver corresponding to each operation check signal may be instructed to stop the output. When the operation check signal indicates normality, the corresponding driver is instructed to permit the output.

Figure 3:
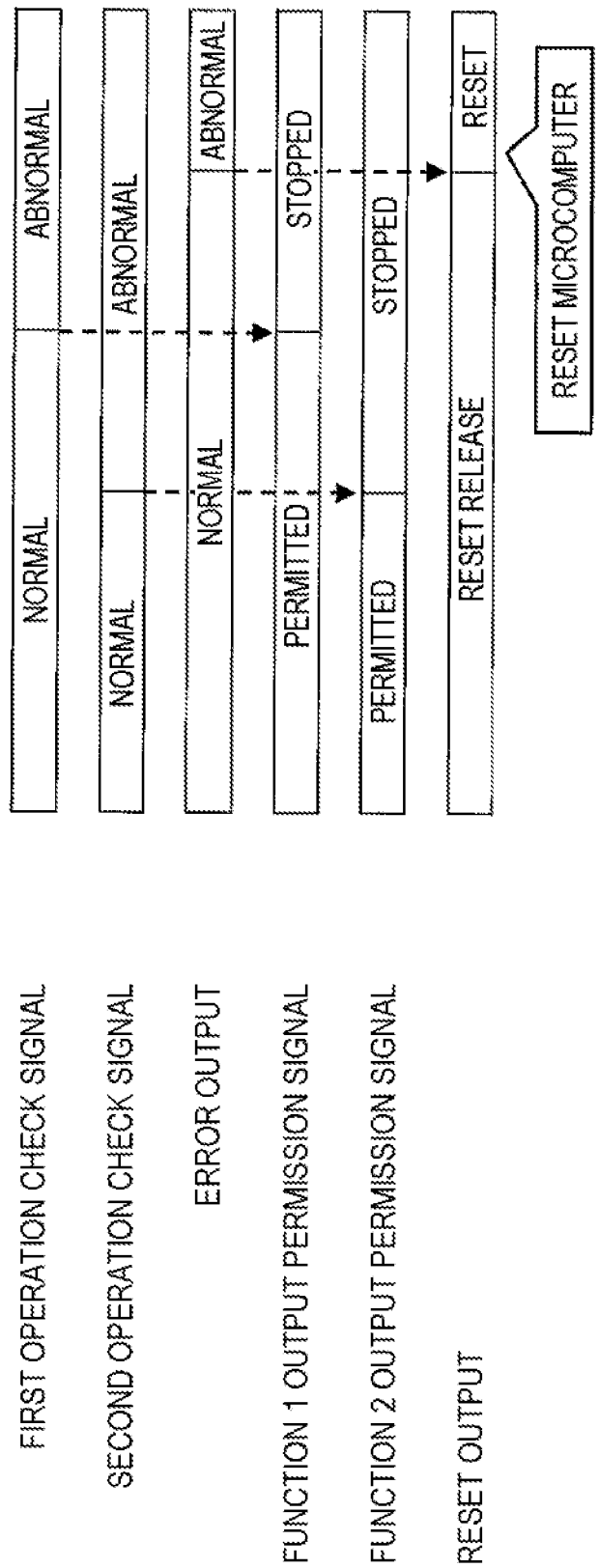
FIG. 3 is a time chart for explaining a procedure in which the determination unit 4 resets a microcomputer 6.

FIG. 3 is a time chart for explaining a procedure in rich the determination unit 4 resets the microcomputer 6.

As described with reference to FIG. 2, every time each operation check signal indicates the abnormality, the determination unit 4 instructs the corresponding driver to stop the output. When all the operation check signals (the first operation cheek signal and the second operation check signal in the first embodiment) indicate the abnormality and an error output is generated from the MPU monitoring unit 15, each CPU does not normally execute the program, and a problem occurs also in the microcomputer 6. In this case, it is considered that it is not possible to continue the operation of the microcomputer 6 any more. Therefore, the determination unit 4 instructs the reset control unit 2 to output a reset signal. FIG. 3 illustrates an example in which, after the second operation check signal indicates the abnormality, the first operation check signal indicates the abnormality, and then the error output is generated.

First Embodiment: Summary

A vehicle mounted electronic control apparatus 100 according to the first embodiment is a vehicle mounted electronic control apparatus (100) mounted on a vehicle. The vehicle mounted electronic control apparatus (100) includes a first driver (18) that outputs a first drive signal for driving a first device included in the vehicle, a second driver (19) that outputs a second drive signal for driving a second device included in the vehicle, a driver control unit (5) that controls an operation state of each of the first driver (18) and the second driver (19), and a computing device (6) including a plurality of computing units configured to execute a control process for controlling the vehicle. The computing device (6) includes, as the computing unit, a first computing portion (11) that executes a first process for controlling the first device and controls the first driver (18) in accordance with a result of the first process, a second computing portion (13) that executes a second process for controlling the second device and controls the second driver (19) in accordance with a result of the second process. The computing device outputs a check signal indicating whether or not the control process is normally executed. The first computing portion (11) outputs, as the check signal, a first operation check signal indicating whether or not the first process is normally executed. The second computing portion (13) outputs, as the check signal, a second operation check signal indicating whether or not the second process is normally executed. When the first operation check signal indicates that the first process is normally executed and the second operation check signal indicates that the second process is not normally executed, the driver control unit (5) causes the first driver (18) to operate normally and sets the second driver (19) to a state where the second driver is degenerated from a normal operation. When the first operation check signal indicates that the first process is not normally executed and the second operation check signal indicates that the second process is normally executed, the driver control unit (5) sets the first driver (18) to a state in which the first driver is degenerated from the normal operation and causes the second driver (19) to operate normally. By bringing the driver into a degenerated state, it is possible to transition the operation of the vehicle to a fail-safe mode while continuing the operation of the CPU. Since it is not necessary to reset the microcomputer 6 (computing device), it is possible to prevent the microcomputer 6 (computing device) from affecting a function that is normally operating.

The vehicle mounted electronic control apparatus (100) further includes a computing device monitoring unit (15) that monitors an occurrence of a problem in the computing device, and a reset control unit (2) that outputs a reset signal for resetting the computing device (6). When the check signal indicates that all the computing units included in the computing device (6) are abnormal, and the computing device monitoring unit (15) detects that a problem has occurred in the computing device (6), the reset control unit (2) resets the computing device (6) by outputting the reset signal to the computing device (6). Thus, when it is assumed that the abnormality level of the microcomputer 6 (computing device) is high, it is possible to attempt to restore the microcomputer to the normal state by resetting the microcomputer.

The computing device (6) continues the first process by the first computing portion (11) even when the first operation check signal indicates that the first process is not normally executed. The computing device (6) continues the second process by the second computing portion (13) even when the second operation check signal indicates that the second process is not normally executed. Thus, it is possible to transition the operation of the vehicle to the fail-safe mode without resetting the microcomputer 6 (computing device).

The computing device (6) continues the second process by the second computing portion (13) even when the first operation check signal indicates that the first process is not normally executed. The computing device (6) continues the first process by the first computing portion (11) even when the second operation check signal indicates that the second process is not normally executed. Thus, it is possible to transition the operation of the vehicle to the fail-safe mode without resetting the microcomputer 6 (computing device).

Second Embodiment

In the first embodiment, it has been described that the driver is set to the degenerated state, in accordance with the operation check signal. However, for example, due to a temporary state of the I/O circuit 17, the wiring, or the like, although the operation check signal is to originally indicate an abnormality, the operation check signal may erroneously indicate normality. Therefore, in a second embodiment of the present invention, a procedure for determining whether the microcomputer 6 is normal, by using the operation check signal/MPU monitoring unit 15/response monitoring unit 3 in combination will be described. The configuration of the vehicle mounted electronic control apparatus 100 is similar to that in the first embodiment.

(Part 1 of Procedure) When both the first operation check signal and the second operation check signal indicate normality, the determination unit 4 further acquires a monitoring result by the MPU monitoring unit 15 and a monitoring result by the response monitoring unit 3. When the MPU monitoring unit 15 detects that a problem has occurred in the microcomputer 6 and the response monitoring unit 3 detects that the CPU 11 is operating normally, there is a possibility that an abnormality has occurred in the CPU 13 or a certain portion related thereto. This is because the CPU 11 is normally operating although the inside of the microcomputer 6 is abnormal. In this case, the determination unit 4 issues an instruction to stop the output of the second driver 19 even though the second operation check signal is normal. The first driver 18 continues the normal operation. Thus, even when the second operation check signal erroneously indicates normality for some reason, it is possible to secure the fail safe of the second driver 19.

(Part 2 of Procedure) When both the first operation check signal and the second operation check signal indicate normality, the determination unit 4 further acquires a monitoring result by the MPU monitoring unit 15 and a monitoring result by the response monitoring unit 3. When the MPU monitoring unit 15 detects that a problem has occurred in the microcomputer 6 and the response monitoring unit 3 detects that the CPU 11 does not operate normally, there is a possibility that an abnormality has occurred in the CPU 11 or a certain portion related thereto. In this case, the determination unit 4 issues an instruction to temporarily stop the output of the first driver 18 even though the first operation check signal is normal. The second driver 19 continues the normal operation. Thus, even when the first operation check signal erroneously indicates normality for some reason, it is possible to secure the fail safe of the first driver 18.

(Part 3 of Procedure) In the part 2 of Procedure, when a state in which the MPU monitoring unit 15 detects that the problem has occurred in the microcomputer 6 and the response monitoring unit 3 detects that the CPU 11 does not operate normally continues, it is desirable to quickly restore the CPU 11 to the normal state. This is because the CPU 11 executes the process having a high functional safety requirement level. Thus, in this case, the determination unit 4 resets the microcomputer 6 via the reset control unit 2. As a result, even when a state in which the first operation check signal erroneously indicates normality continues for some reason, it is possible to quickly restore the first driver 18 to the normal state.

Second Embodiment: Summary

In the vehicle mounted electronic control apparatus (100) according to the second embodiment, a functional safety level required for the first process is higher than a functional safety level required for the second process. The vehicle mounted electronic control apparatus (100) further includes a computing device monitoring unit (15) that monitors an occurrence of a problem in the computing device (6), and a response monitoring unit (3) that monitors whether or not the first computing portion (11) is operating normally. When the first operation check signal indicates that the first process is normally executed, the second operation check signal indicates that the second process is normally executed, the computing device monitoring unit (15) detects that a problem has occurred in the computing device (6), and the response monitoring unit (3) detects that the first computing portion (11) is operating normally, the driver control unit (5) causes the first driver (18) to operate normally, and sets the second driver to a state where the second driver (19) is degenerated from the normal operation. Thus, even when the second operation check signal erroneously indicates normality for some reason, it is possible to secure the fail safe of the second driver 19.

In the vehicle mounted electronic control apparatus (100) according to the second embodiment, a functional safety level required for the first process is higher than a functional safety level required for the second process. The vehicle mounted electronic control apparatus (100) further includes a computing device monitoring unit (15) that monitors an occurrence of a problem in the computing device (6), and a response monitoring unit (3) that monitors whether or not the first computing portion (11) is operating normally. When the first operation check signal indicates that the first process is normally executed, the second operation check signal indicates that the second process is normally executed, the computing device monitoring unit (15) detects that a problem has occurred in the computing device (6), and the response monitoring unit (3) detects that the first computing portion (11) does not operate normally, the driver control unit (5) temporarily sets the first driver (18) to a state where the first driver is degenerated from the normal operation, and causes the second driver (19) to operate normally. Thus, even when the first operation cheek signal erroneously indicates normality for some reason, it is possible to secure the fail safe of the first driver 18.

The vehicle mounted electronic control apparatus (100) according to the second embodiment further includes a reset control unit (2) that outputs a reset signal tbr resetting the computing device (6). When the first operation check signal indicates that the first process is normally executed, the second operation check signal indicates that the second process is normally executed, the computing device monitoring unit (15) detects that a problem has occurred in the computing device (6), and a state where the response monitoring unit (15) detects that the first computing portion (11) does not operate normally is continuously established for a predetermined period or more, the reset control unit (2) resets the computing device (6) by outputting the reset signal to the computing device (6).

As a result, even when a state in which the first operation check signal erroneously indicates normal continues for some reason, it is possible to quickly restore the first driver 18 to the normal state.

Third Embodiment

In the first and second embodiments, it has been described that the driver stops outputting the drive signal to set the driver to the degenerated state from the normal operation. For example, when the driver is configured by a switching element, the above operation can be performed by fixing the signal level of a drive terminal (such as a gate terminal) of the switching element to an OFF state. The degenerated state of the driver is not limited thereto, and other forms of the degenerated state are also conceivable.

For example, it is considered that, by setting the driver to continue the operation without relying on the instruction from the microcomputer 6, it is possible to secure the operation continuity although the flexibility of the operation is impaired. For example, the driver can be configured to continue the prescribed operation without relying on the microcomputer 6, by connecting the circuit in which the prescribed operation to the driver and disconnecting the connection between the driver and the microcomputer 6. This is equivalent to transition of the driver to the fail-safe mode in terms of securing the operation continuity of the driver, and thus can be said to be a form of the degenerated state. The same applies to both the first driver 18 and the second driver 19.

Third Embodiment: Summary

In the vehicle mounted electronic control apparatus (100), the driver control unit (5) sets the first driver (18) to a state where the first driver (18) is degenerated from the normal operation, by controlling the first driver (18) not to output the first drive signal. The driver control unit (5) sets the second driver (19) to a state where the second driver (19) is degenerated from the normal operation, by controlling the second driver (19) not to output the second drive signal.

Alternatively, the driver control unit (5) may set the first driver (18) to a state in which the first driver (18) is degenerated from the normal operation, by setting the first driver (18) to a state where an operation is continued without relying on the first drive signal, and the driver control unit (5) may set the second driver (19) to a state in which the second driver (19) is degenerated from the normal operation, by setting the second driver (19) to a state where an operation is continued without relying on the second drive signal.

Modification Examples of Present Invention

The present invention is not limited to the above embodiments, and various modification examples may be provided. For example, the above embodiment is described in detail in order to explain the present invention in an easy-to-understand manner, and the above embodiment is not necessarily limited to a case including all the described configurations. Further, some components in one embodiment can be replaced with the components in another embodiment, and the configuration of another embodiment can be added to the configuration of one embodiment. Regarding some components in the embodiments, other components can be added, deleted, and replaced.

Figure 4:
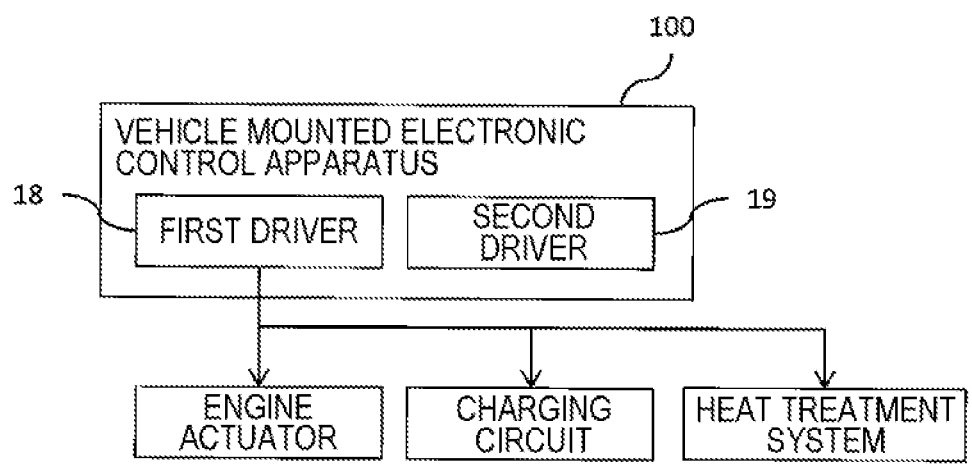
FIG. 4 is a diagram illustrating an example of a device controlled by the vehicle mounted electronic control apparatus 100.

FIG. 4 is a diagram illustrating an example of the device controlled by the vehicle mounted electronic control apparatus 100 according to the present invention. The vehicle mounted electronic control apparatus 100 has been described in any one of the first to third embodiments. The vehicle mounted electronic control apparatus 100 can control the following crisis as the first function 7, for example. (a) Actuators of the engine mounted on the vehicle, for example, a fuel injection nozzle and throttle; (b) a charging circuit that supplies a charging current to a battery mounted on the vehicle; and (c) a fluid is circulated in the vehicle in a heat treatment system that controls heat in the vehicle, that is, a heat control system using a fluid, for example, a water cooling system. Since the systems are required to continue the operation, it is desirable to perform control by the first driver 18. Although FIG. 4 illustrates that one first driver 18 controls three devices, this is an example for description, and a driver equivalent to the first driver 18 may be provided for each device.

That is, in the vehicle mounted electronic control apparatus (100), at least any one of the first driver (18) and the second driver (19) can output a drive signal for driving at least any one of an actuator of an engine included in the vehicle, a circuit that supplies a charging current for charging a battery included in the vehicle, and a heat treatment system for controlling heat of the vehicle.

In the above embodiments, when each operation check signal is restored to the normal state during a period after the first operation check signal or the second operation check signal indicates the abnormality and before the microcomputer 6 is reset, the determination unit 4 may restore each driver to the normal state. When the microcomputer 6 is reset before the operation check signal is restored to the normal state, the processes similar to those in the above embodiment may be performed again.

That is, in the vehicle mounted electronic control apparatus (100), when the check signal indicates that both the first process and the second process are nomal, before the computing device (6) is reset after the check signal indicates that either the first process or the second process is not normal, the driver control unit (5) may cause both the first driver (18) and the second driver (19) to normally operate.

In the above embodiments, it has been described that the microcomputer 6 is a multi-processor microcomputer, but the present invention can be applied even when the microcomputer 6 is a multi-core microcomputer. In this case, a different function is executed for each core.

In the above embodiments, it has been described that the microcomputer 6 includes two CPUs, but the present invention can also be applied to a case where the microcomputer 6 includes three or more CPUs (or processor cores). In this case, each processor executes a different function. The operation when the operation check signal indicates that all the processors are abnormal and the MPU monitoring unit 15 indicates the internal abnormality is similar to that described in the first embodiment.

REFERENCE SIGNS LIST 1 monitoring unit
2 reset control unit
3 response monitoring unit
4 determination unit
5 driver control unit
6 microcomputer
11 CPU
13 CPU
15 MPU monitoring unit
18 first driver
19 second driver
100 vehicle mouthed electronic control apparatus

The invention claimed is:

1. A vehicle mounted electronic control apparatus mounted on a vehicle, the vehicle mounted electronic control apparatus comprising:
   a first driver that outputs a first drive signal for driving a first device included in the vehicle; a second driver that outputs a second drive signal for driving a second device included in the vehicle, wherein the first device has a higher priority device than then second device;
   a monitoring unit; and
   a microcomputer comprising an MPU monitoring unit, a first computing unit and a second computing unit, wherein:
   the first computing unit includes a first CPU and a first lockstep that each execute that executes a first process to generate a respective first result for controlling the first device, and
   the second computing unit include a second CPU and a second lockstep that each execute that executes a second process to generate a respective second result for controlling the second device, wherein the first process and the second process are separately executed by the first computing unit and the second computing unit, and
   the MPU monitoring unit to:
   generate a first operation check signal by comparing the respective first result of the first CPU and the first lockstep executing the first process, and
   generate a second operation check signal by comparing the second respective result of the second CPU and the second lockstep executing the second process;
   wherein the monitoring unit further:
   receive the first operation check signal and the second operation check signal,
   in response to the first operating check signal indicating that the first process is normally executed and the second operation check signal indicates that the second process is not normally executed, cause the first driver to operate normally and set the second driver to a state where the second driver is degenerated from a normal operation, such that the vehicle is in a fail-safe mode and the microcomputer continues to operate,
   when in response to the first operation check signal indicating that the first process is not normally executed and the second operation check signal indicates that the second process is normally executed, set the first driver to a state in which the first driver is degenerated from the normal operation and cause the second driver to operate normally such that the vehicle is in the fail-safe mode and the microcomputer continues to operate, and
   in response to the first operation check signal indicating that processor is not normally executed and the second operation check signal indicates that second process is not normally executed, reset the microcomputer the computing device continues operating, and the computing device is not restarted.

2. The vehicle mounted electronic control apparatus according to claim 1, wherein the second process is executed even when the first operation check signal indicates that the first process is not normally executed, and
   the first process is executed even when the second operation check signal indicates that the second process is not normally executed.

3. The vehicle mounted electronic control apparatus according to claim 1, wherein in response to the first operation check signal indicating that the first process is not normally executed and the second operation check signal indicates that the second process is normally executed, the monitoring unit further resets the microcomputer after a predetermined elapsed period of time.

4. The vehicle mounted electronic control apparatus according to claim 1, wherein the monitor unit comprises a driver controller unit and the driver control unit to:
set the first driver to a state where the first driver is degenerated from the normal operation, by controlling the first driver not to output the first drive signal, and
set the second driver to a state where the second driver is degenerated from the normal operation, by controlling the second driver not to output the second drive signal.

5. The vehicle mounted electronic control apparatus according to claim 1, wherein the monitor unit comprises a driver controller unit and the driver control unit to:
set the first driver to a state in which the first driver is degenerated from the normal operation, by setting the first driver to a state where an operation is continued without relying on the first drive signal, and
set the second driver to a state in which the second driver is degenerated from the normal operation, by setting the second driver to a state where an operation is continued without relying on the second drive signal.

6. The vehicle mounted electronic control apparatus according to claim 1, wherein the monitor unit comprises a driver controller unit and the driver controller is configured to cause both the first driver and the second driver to normally operate in response to the first check operation signal returning to normal.

7. The vehicle mounted electronic control apparatus according to claim 1, wherein at least any one of the first driver and the second driver outputs a drive signal for driving at least any one of an actuator of an engine included in the vehicle, a circuit that supplies a charging current for charging a battery included in the vehicle, and a heat treatment system for controlling heat of the vehicle.

* * * * *